US011996652B2

(12) United States Patent
Johnson et al.

(10) Patent No.: US 11,996,652 B2
(45) Date of Patent: May 28, 2024

(54) PCB CARD MAGNETIC CONNECTOR SYSTEM

(71) Applicant: Onanon, Inc., Milpitas, CA (US)

(72) Inventors: Dennis J. Johnson, Milpitas, CA (US); Keyon Keshtgar, Milpitas, CA (US)

(73) Assignee: Onanon, Inc., Milpitas, CA (US)

( * ) Notice: Subject to any disclaimer, the term of this patent is extended or adjusted under 35 U.S.C. 154(b) by 187 days.

(21) Appl. No.: 17/524,998

(22) Filed: Nov. 12, 2021

(65) Prior Publication Data

US 2023/0155322 A1 May 18, 2023

(51) Int. Cl.
*H01R 13/62* (2006.01)
*H01R 12/73* (2011.01)

(52) U.S. Cl.
CPC ....... *H01R 13/6205* (2013.01); *H01R 12/737* (2013.01)

(58) Field of Classification Search
CPC . H01R 13/6205; H01R 12/721; H01R 12/737
See application file for complete search history.

(56) References Cited

U.S. PATENT DOCUMENTS 3,808,577 A 4/1974 Mathauser
4,874,316 A 10/1989 Kamon
5,401,175 A 3/1995 Guimond
6,623,276 B2 9/2003 Ferrerfabrega
6,893,268 B1 * 5/2005 Harari ................ G06F 13/4068 439/43
7,311,526 B2 12/2007 Rohrbach
7,329,128 B1 * 2/2008 Awad ................ H01R 13/6205 439/38
8,348,678 B2 1/2013 Hardisty
8,520,401 B2 * 8/2013 Tian ........................ G06F 1/185 365/72
8,570,760 B2 * 10/2013 Chen ................ H01R 12/7082 361/801
8,625,303 B2 * 1/2014 Yin ........................ G06F 1/185 361/791
9,300,081 B2 * 3/2016 Rudisill ................ H01R 11/30
9,543,694 B2 * 1/2017 Tagawa .................... H04N 5/32
9,728,915 B2 * 8/2017 Aldehayyat ........... G06F 1/1616
9,985,384 B1 5/2018 Johnson
10,396,491 B2 * 8/2019 Hsu .................... H01R 13/6205
10,483,688 B2 * 11/2019 Wrisley ............... H01R 13/665
10,998,672 B2 * 5/2021 Weis ........................ H05K 3/36
11,016,538 B2 * 5/2021 Lange ................... G06F 1/1656
11,289,849 B2 * 3/2022 Jani .................... H01R 13/6205
11,385,601 B2 * 7/2022 Yaghmour ............ G06F 13/409
11,431,125 B2 * 8/2022 Li ...................... H01R 13/6205
11,579,592 B2 * 2/2023 Rieger ............... G05B 19/4185

* cited by examiner

*Primary Examiner* — Thanh Tam T Le
(74) *Attorney, Agent, or Firm* — Neustel Law Offices

(57) ABSTRACT

An edge connector on a printed circuit board ("PCB") uses a magnetic force to retain the PCB connected to another connector and to reduce the insertion force. In an example embodiment, a male edge connector includes a first magnetic connector and a female connector includes a second magnetic connector. A first force of attraction between the first magnetic connector and the second magnetic connector holds the male edge connector inserted into the female connector. The first force of attraction further reduces the force required to insert the male edge connector into the female connector.

20 Claims, 5 Drawing Sheets

PCB CARD MAGNETIC CONNECTOR SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

The described example embodiments in general relate to connectors for connecting to a printed circuit board ("PCB"). A PCB may include a connector to connect the PCB to other PCBs or to other devices. The connector on the PCB may be along the edge of the PCB, which is referred to as an edge connector. Generally, an edge connector on a PCB is a male connector that inserts into a female connector to establish a mechanical and electrical connection. Prior art edge connectors have used stamped contact pins with weld tabs to increase the mechanical strength of connection between the male edge connector and the female connector. Connectors would benefit from a system that uses a magnetic force to connect the edge connector to another connector.

SUMMARY

Some of the various embodiments of the present disclosure relate to a printed circuit board ("PCB") with an edge connector. Some of the various embodiments of the present disclosure include magnetic couplers to hold an edge connector in contact with another connector. Some of the various embodiments of the present disclosure include magnetic couplers to decrease a force of insertion of a PCB with an edge connector into another connector. In an example embodiment, a PCB with a male edge connector may include one or more magnetic couplers. The male edge connector is adapted to be inserted into a female connector to connect the PCB to the female connector and/or to the component connected to the female connector. The one or more magnetic couplers of the male edge connector are adapted to retain the PCB in the female connector after it has been inserted. In other words, the one or more magnetic couplers of the male edge connector are adapted to hold the male edge connector in the female connector. The magnetic couplers use a magnetic force to retain the male edge connector in the female connector. The magnetic couplers use the magnetic force to reduce the insertion force needed to insert the male edge connector into the female coupler.

Magnetic couplers may also be used to key the edge connector so that the edge connector can be connected to another connector only while the edge connector is positioned at a particular orientation. For example, magnetic couplers may exert a magnetic force (e.g., repulsion) to prevent the insertion of the edge connector into another connector if the orientation of the edge connector does not match the expected orientation.

In some embodiments, a male edge connector is inserted into a female connector and held in place by a magnetic force exerted by magnetic couplers. In other embodiments, a female edge connector is inserted over (e.g., around) a male connector and held in place by a magnetic force exerted by magnetic couplers.

There has thus been outlined, rather broadly, some of the embodiments of the present disclosure in order that the detailed description thereof may be better understood, and in order that the present contribution to the art may be better appreciated. There are additional embodiments of that will be described hereinafter and that will form the subject matter of the claims appended hereto. In this respect, before explaining at least one embodiment in detail, it is to be understood that the various embodiments are not limited in its application to the details of construction or to the arrangements of the components set forth in the following description or illustrated in the drawings. Also, it is to be understood that the phraseology and terminology employed herein are for the purpose of the description and should not be regarded as limiting.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evidence to the contrary from the description, where elements in different FIGS. use identical reference numbers, the elements are generally either identical or at least similar in function or purpose.

DETAILED DESCRIPTION

A. Overview

Figure 1:
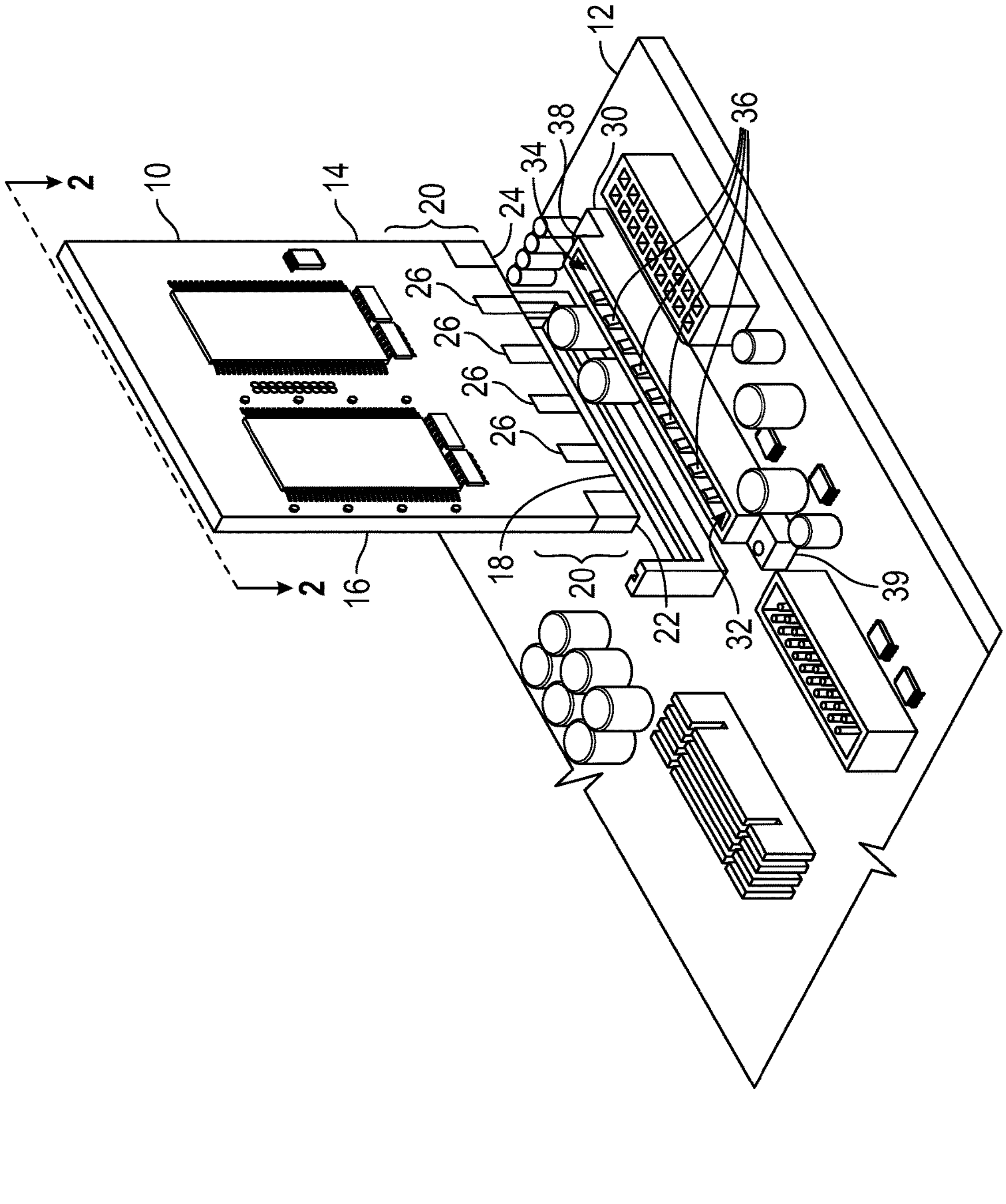
FIG. 1 is a perspective view of a male edge connector and a female connector in accordance with an example embodiment.

Some of the various embodiments of the present disclosure relate to a printed circuit board ("PCB") (e.g., 10) with an edge connector (e.g., 20, 40). An edge connector, such as the example embodiments of the male edge connector 20 and the female edge connector 40, are positioned on an edge of a PCB 10 so that the PCB 10 may connect to another connector such as, for example, female connector 30 or male connector 50 respectively.

An edge connector (e.g., 20, 40) include pins (e.g., 26, 46). The pins of the edge connector (e.g., 26, 46) are adapted to connect to the pins (e.g., 36, 56) of the connector (e.g., 30, 50). In an example embodiment, the connector (e.g., 30, 50) is connected to the PCB 12, so connecting the edge connector (e.g., 20, 40) to the connector (e.g., 30, 50) connects the PCB 10 to the PCB 12 via the pins (e.g., to 36, 46 to 56). The PCB 10 remains coupled to the PCB 12 as long as the edge connector (e.g., 20, 40) remains coupled to the connector (e.g., 30, 50). Conventionally, the PCB 10 would be mechanically held in contact with the female connector 30 or the male connector 50; however, in accordance with various aspects of the present disclosure, the male edge connector 20 and the female edge connector 40 include magnetic couplers (e.g., 22, 24, 32, 34, 42, 44, 52, 54) that magnetically hold (e.g., retain) the male edge connector 20 and the female edge connector 40 to the female connector 30 and the male connector 50 respectively.

A magnetic coupler may be a magnet (e.g., permanent) or formed of a ferrous metal (e.g., a tab formed of ferrous metal). A magnet may be paired with a tab or another magnet to magnetically couple an edge connector (e.g., 20, 40) to a connector (e.g., 30, 50). In an example embodiment, magnetic coupler 22 is a magnet and magnetic coupler 32 is a tab formed of a ferrous metal. The magnet is adapted to establish a magnetic force of attraction between itself and the tab 32 thereby magnetically coupling the male edge connector 20 to the female connector 30. In another example embodiment, the magnetic coupler 22 is a tab formed of a ferrous metal and the magnetic coupler 32 is a magnet. The magnet 32 is adapted to establish a magnetic force of attraction between itself and the tab thereby magnetically coupling the male edge connector 20 to the female connector 30. Any appropriate combination of magnets and tabs may be used to magnetically couple the edge connector (e.g., 20, 40) to a connector (e.g., 30, 50).

Magnetic couplers formed of magnets having a polarity may be used to key the connection between the edge connector and the connector so that the PCB may be inserted into the connector at a single orientation.

B. Male Edge Connector

Figure 2:
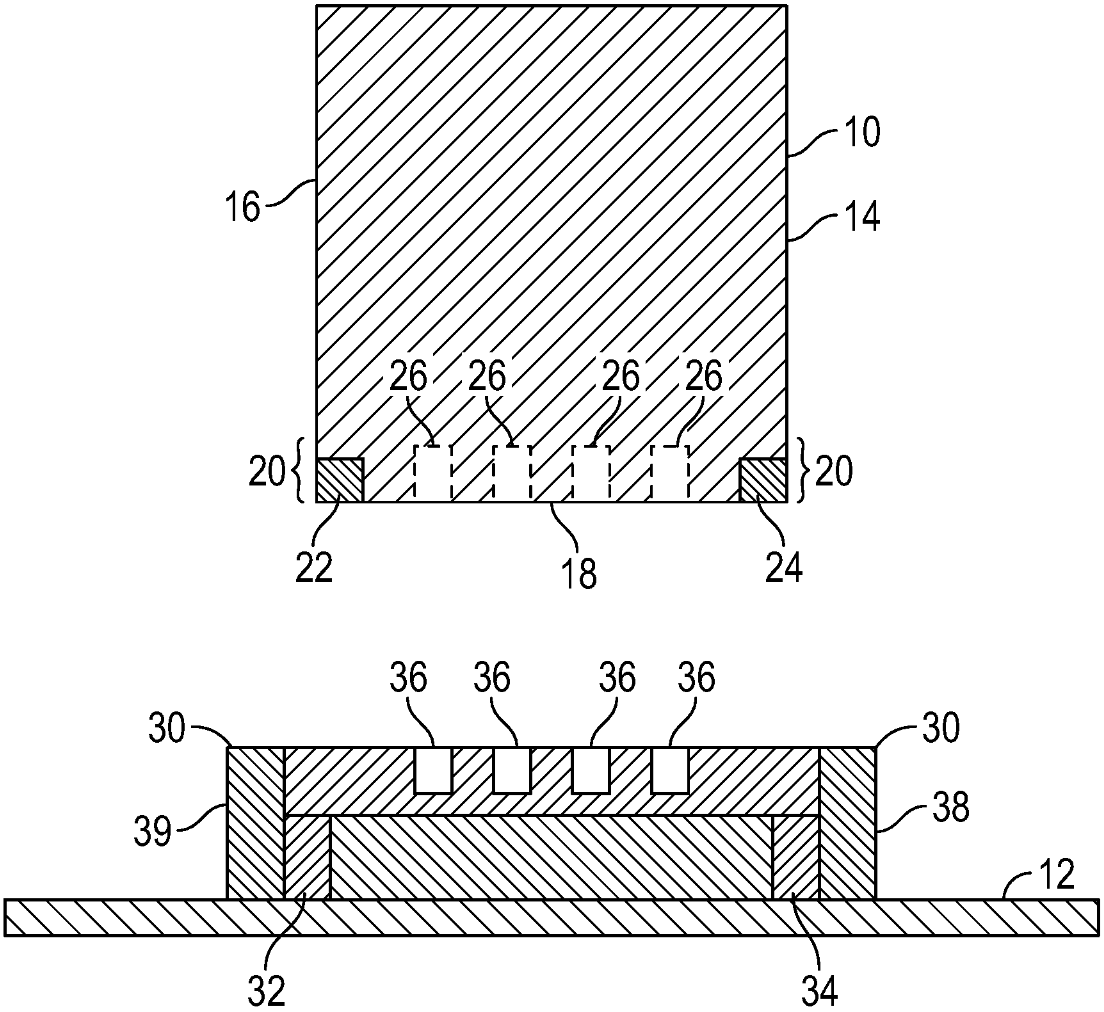
FIG. 2 is a cross-section of the male edge connector and the female connector of FIG. 1.

The male edge connector 20, as best seen in FIGS. 1-2, is a connector positioned on or near an edge 18 of the PCB 10. The male edge connector 20 that is adapted to be inserted into a female connector 30. The female connector 30 that receives the male edge connector 20 may be positioned on a second PCB, such as for example PCB 12. While the male edge connector 20 is inserted into the female connector 30, the PCB 10 is electrically connected to the PCB 12. Connecting the PCB 10 to the PCB 12 may connect components (e.g., electronic circuits, integrated circuits, electrical devices) of the PCB 10 to components of the PCB 12.

In an example embodiment, the male edge connector 20 includes the PCB 10, one or more pins 26 connected to the PCB 10 along the edge 18 of the PCB 10 and a first magnetic coupler 22 positioned on or near the edge 18 of the PCB 10. The edge 18 of the PCB 10 is adapted to be inserted into the female connector 30. The female connector 30 may be positioned on the PCB 12. The female connector 30 includes one or more pins 36 and a second magnetic coupler 32. The first magnetic coupler 22 is connected to the PCB 10. The first magnetic coupler 22 may be connected to the PCB 10 on or near the edge 18 at any position along a length of the edge 18. In an example embodiment, the magnetic coupler 22 is connected proximate to a side 16 of the PCB 10. In an example embodiment, the magnetic coupler 22 is connected near a midway point between the side 14 and the side 16 of the PCB 10.

The second magnetic coupler 32 is connected to the female connector 30. The second magnetic coupler 32 may be inside a slot of the female connector 30 that receives the edge 18 of the PCB 10 or it may be outside of the slot. In an example embodiment, the magnetic coupler 32 is positioned inside the slot of the female connector 30. While the male edge connector 20 is inserted into the female connector 30, the one or more pins 26 along the edge 18 of the PCB 10 are adapted to contact the one or more pins 36 of the female connector 30 to establish one or more electrical connections. The first magnetic coupler 22 is adapted to establish a first force of attraction with the second magnetic coupler 32 of the female connector 30. According to various aspects of the present disclosure, the first force of attraction is a magnetic force of attraction. The first force of attraction is adapted to retain the edge 18 of the PCB 10 inserted into the female connector 30, which in turn retains the pins 26 in contact with and electrically connected to the pins 36. In other words, the force that holds the PCB 10, and the male edge connector 20 in particular, in the female connector 30 is a magnetic force rather than a mechanical force. The force of contact between the pins 26 and the pins 36, and the force of contact between the PCB 10 and the sides of the female connector 30 may provide some mechanical force that operates to retain the male edge connector 20 inserted into the female connector 30; however, the majority of the force that retains the male edge connector 20 inserted into the female connector 30 is the magnetic attractive force of attraction between the magnetic coupler 22 and the magnetic coupler 32.

The first magnetic coupler 22 and the second magnetic coupler 32, as best seen in FIG. 2, may be any combination of magnets or formed of a ferrous metal (e.g., a tab) that results in a magnetic force that attracts the first magnetic coupler 22 to the second magnetic coupler 32 or vice versa. In an example embodiment, the first magnetic coupler 22 is a magnet, preferably a permanent magnet, and the second magnetic coupler 32 is formed of a ferrous metal. For example, the second magnetic coupler 32 may be a metal tab connected to the female connector 30. Because the tab is formed of a ferrous metal, the magnetic force from the magnet attracts the tab to the magnet. The force between the magnet on the male edge connector 20 and the tab on the female connector 30 (e.g., the first force of attraction) retains the male edge connector 20 in the female connector 30. In another example embodiment, the first magnetic coupler 22 is formed of a ferrous metal and the second magnetic coupler 32 is a magnet, preferably a permanent magnet. For example, the first magnetic coupler 22 may be a metal tab connected on or near the edge of the PCB 10. Again, because the tab is formed of a ferrous metal, the magnetic force from the magnet attracts the tab to the magnet. The force between the tab on the PCB 10 and the magnet on the female connector 30 (e.g., the first force of attraction) retains the male edge connector 20 in the female connector 30. In the above example embodiments, at least one of the first magnetic coupler 22 and the second magnetic coupler 32 is a magnet.

In another example embodiment, the first magnetic coupler 22 is a magnet, preferably a permanent magnet, and the second magnetic coupler 32 is also a magnet, preferably a permanent magnet. The pole of the magnet on the male edge connector 20 and the pole of the magnet on the female connector 30 are arranged (e.g., position) so that the magnet on the PCB 10 is attracted to the magnet on the female connector 30. Because the magnets are attracted to each other, the force between the magnet on the PCB 10 and the magnet on the female connector 30 (e.g., the first force of attraction) retains the male edge connector 20 in the female connector 30.

The force that retains the male edge connector 20 in (e.g., connected to) the female connector 30 (e.g., first force of attraction, second force of attraction) is proportional to the magnetic force provided by the magnet. A magnet may provide a magnetic force of attraction of sufficient strength (e.g., magnitude) to retain the male edge connector 20 inserted into the female connector 30 and the pins 26 connected to the pins 36 under normal circumstances of use.

When the first magnetic coupler 22 and the second magnetic coupler 32 are implemented as magnets, it is possible to arrange the pole of the magnet on the male edge connector 20 and the pole of the magnet on the female connector 30 so that the magnet on the male edge connector 20 repels the magnet on the female connector 30; however, a repelling force does not retain the male edge connector 20 in the female connector 30, so it is desirable to position the poles of the magnets so that they attract each other. The repulsive force between magnets may be used to key how the edge connector (e.g., 20, 40) mates with the connector (e.g., 30, 50) as discussed below.

The attractive force between the first magnetic coupler 22 and the second magnetic coupler 32 not only retains the male edge connector 20 connected to the female connector 30, but the first force of attraction between the first magnetic coupler 22 and the second magnetic coupler 32 is adapted to draw the edge 18 of the PCB 10 into the female connector 30 thereby reducing a force of insertion between the PCB 10 and the female connector 30. In other words, the force of attraction between the first magnetic coupler 22 and the second magnetic coupler 32 makes it easier to insert the male edge connector 20 on the PCB 10 into the female connector 30.

In another example embodiment, as best seen in FIG. 2, the male edge connector 20 includes a third magnetic coupler 24 and the female connector 30 includes a fourth magnetic coupler 34. The third magnetic coupler 24 is connected to the male edge connector 20 of the PCB 10 at or near the edge 18 of the PCB 10. The third magnetic coupler 24 may be connected to the male edge connector 20 of the PCB 10 at any position along the edge 18. In an example embodiment, the third magnetic coupler 24 is connected to the male edge connector 20 of the PCB 10 at or near the edge 18 of the PCB 10 proximate to the side 14 of the PCB 10. The fourth magnetic coupler 34 is connected to the female connector 30. The fourth magnetic coupler 34 may be inside the slot that receives the edge 18 of the male edge connector 20 of the PCB 10 or it may be outside of the slot. In an example embodiment, the fourth magnetic coupler 34 is positioned inside the slot of the female connector 30.

The third magnetic coupler 24 is adapted to establish a second force of attraction with the fourth magnetic coupler 34. According to various aspects of the present disclosure, the second force of attraction is a magnetic force of attraction. The first force of attraction, adapted to be established by the first magnetic coupler 22 and the second magnetic coupler 32 discussed above, and the second force of attraction are adapted to retain the edge 18 of the PCB 10 inserted into the female connector 30. As discussed above, the first force of attraction and the second force of attraction not only retain the edge 18 of the PCB 10 inserted into the female connector 30, but the first force of attraction and the second force of attraction are adapted to draw the edge 18 of the PCB 10 into the female connector 30 thereby reducing a force of insertion between the PCB 10 and the female connector 30.

As discussed above with respect to the first magnetic coupler 22 and the second magnetic coupler 32, the third magnetic coupler 24 and the fourth magnetic coupler 34 may be any combination of magnets or tabs formed of a ferrous metal that establishes the second force of attraction between the third magnetic coupler 24 and the fourth magnetic coupler 34. In an example embodiment, at least one of the third magnetic coupler 24 and the fourth magnetic coupler 34 is a magnet. In another example embodiment, third magnetic coupler 24 is a magnet, preferably a permanent magnet, and the fourth magnetic coupler 34 is a tab formed of a ferrous metal. In another example embodiment, third magnetic coupler 24 is a tab formed of a ferrous metal and the fourth magnetic coupler 34 is a magnet, preferably a permanent magnet. In another example embodiment, the third magnetic coupler 24 is a magnet, preferably a permanent magnet, and the fourth magnetic coupler 34 is also a magnet, preferably a permanent magnet. The pole of the magnet on the male edge connector 20 of the PCB 10 and the pole of the magnet on the female connector 30 are arranged so that the magnet on the PCB 10 is attracted to the magnet on the female connector 30.

In an example embodiment in which the male edge connector 20 includes a first magnet coupler 22 and a third magnetic coupler 24 and the female connector 30 includes the second magnetic coupler 32 and a fourth magnetic coupler 34, at least one of the first magnetic coupler 22 and the second magnetic coupler 32 is a magnet. In another example embodiment, at least one of the third magnetic coupler 24 and the fourth magnetic coupler 34 is a magnet.

C. Magnetic Connector System with Male Edge Connector and Female Connector

The PCB 10 with a male edge connector 20 may cooperate with the female connector 30 to operate as a magnetic connector system, as best seen in FIGS. 1 and 2. In an example embodiment, a magnetic connector system includes the female connector 30 and the PCB 10. The female connector 30 has one or more pins 36 and a first magnetic coupler 32. The female connector 30 may be mechanically and/or electrically coupled to the PCB 12. The first magnetic coupler 32 is connected to the female connector 30. The PCB 10 has the one or more pins 26 positioned along the edge 18 of the PCB 10 and a second magnetic coupler 22 positioned on or near the edge 18 of the PCB 10. The second magnetic coupler 22 is connected to the PCB 10. The edge 18 of the PCB 10 is adapted to be inserted into the female connector 30, so the edge 18 of the PCB 10 operates as a male edge connector 20 as discussed above. The one or more pins 26 of the PCB 10 are adapted to contact the one or more pins 36 of the female connector 30 to establish one or more electrical connections. The first magnetic coupler 32 is adapted to establish a first force of attraction with the second magnetic coupler 22. The first force of attraction is adapted to retain the edge 18 of the PCB 10 inserted into the female connector 30.

In the above example embodiment of the magnetic connector system, the edge 18 of the PCB 10 performs the functions of the male edge connector 20 as discussed above and the female connector 30 performs the functions of the female connector 30 discussed above. So, all of the operations and interactions between the male edge connector 20 of the PCB 10 and the female connector 30 discussed above applies to the PCB 10 and the female connector 30 of the magnetic connector system discussed herein. For example, the female connector 30 may include a third magnetic coupler 34 and the PCB 10 may include a fourth magnetic coupler 24. The first magnetic coupler 32 and the second magnetic coupler 22 are adapted to establish a first force of attraction while the third magnetic coupler 34 and the fourth magnetic coupler 24 are adapted to establish a second force of attraction. The first force of attraction and/or the second force of attraction are adapted to retain the edge 18 of the PCB 10 inserted into the female connector 30. The first force of attraction and/or the second force of attraction are adapted to draw the edge 18 of the PCB 10 into the female connector 30 thereby reducing the force of insertion between the PCB 10 and the female connector 30. The first magnetic coupler 32 and the second magnetic coupler 22, or the third magnetic coupler 34 and the fourth magnetic coupler 24, of the magnetic connector system may be any combination of magnets or formed of a ferrous metal (e.g., a tab).

D. Female Edge Connector

Figure 3:
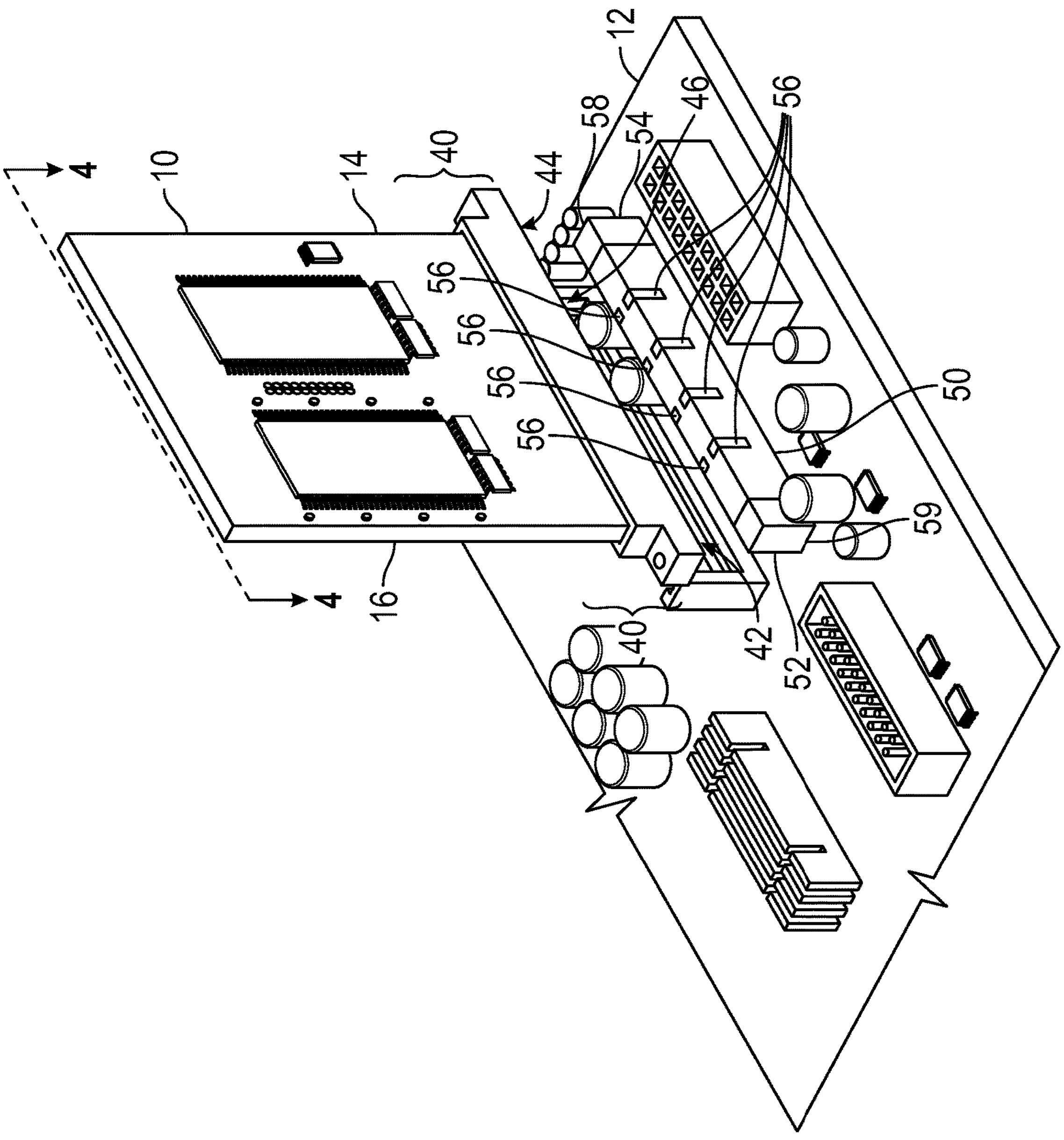
FIG. 3 is a perspective view of a female edge connector and a male connector in accordance with an example embodiment.
Figure 4:
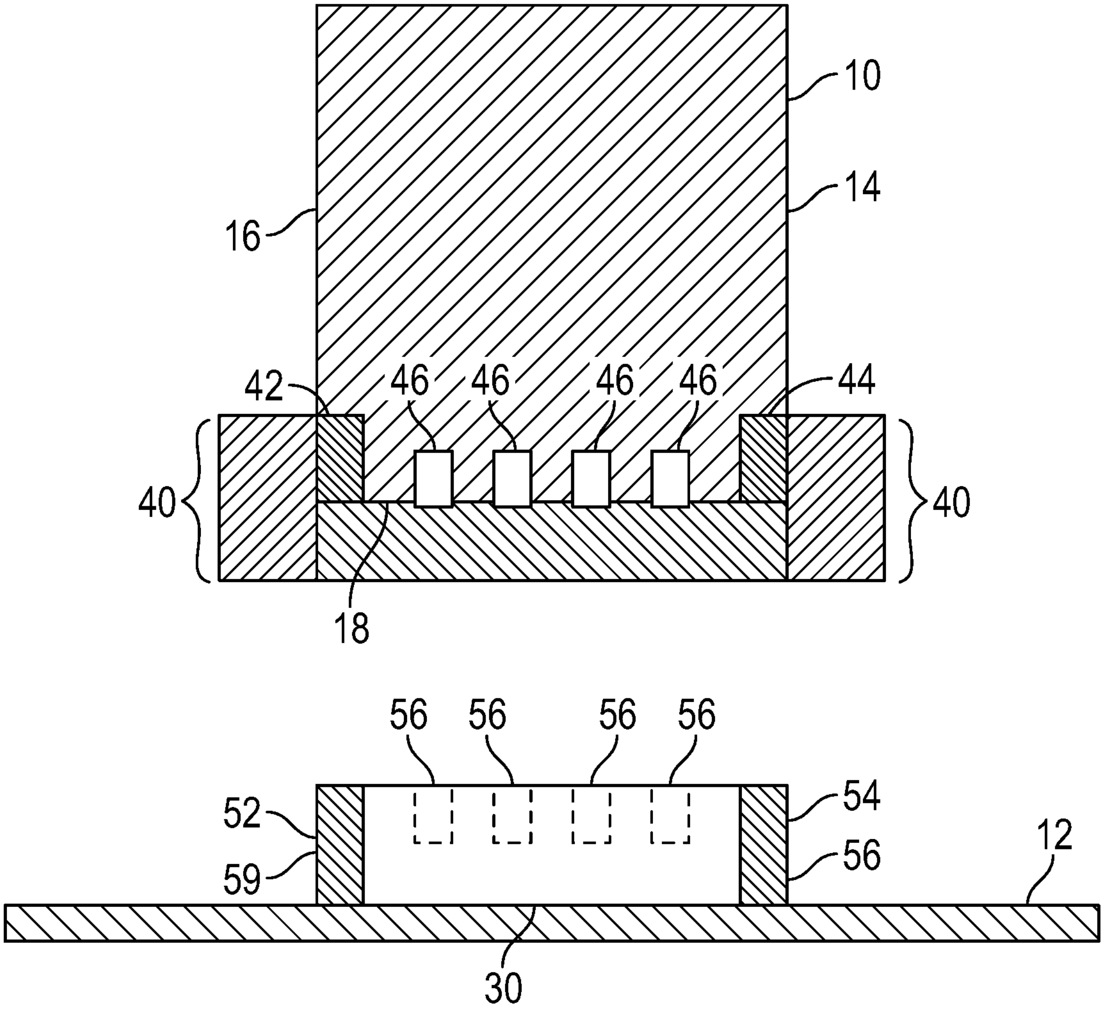
FIG. 4 is a cross-section of the female edge connector and the male connector of FIG. 3.

In another example embodiment, as best seen in FIGS. 3 and 4, the PCB 10 includes a female edge connector 40 that is adapted to connect to a male connector 50. The female edge connector 40 may be along a portion or the entire length of the edge 18 of the PCB 10. The female edge connector 40 includes structure adapted for enclosing or encircling the male connector 50. The male connector 50 may be coupled to the PCB 12. The female edge connector 40 and the male connector 50 form a magnetic connector system in which the male connector 50 is adapted to couple to the female edge connector 40 using a magnetic force.

In an example embodiment, the magnetic connector system includes the male connector 50 having one or more pins 56 and a first magnetic coupler 52 and the PCB 10 having a female edge connector 40 along the edge 18 of the PCB 10. The female edge connector 40 includes one or more pins 46 and a second magnetic coupler 42 positioned inside the female edge connector 40. The male connector 50 is adapted to be inserted into the female edge connector 40 (e.g., slot therein) whereby the one or more pins 46 of the female edge connector 40 contact the one or more pins 56 of the male connector 50 to establish one or more electrical connections. The first magnetic coupler 52 is adapted to establish a first force of attraction with the second magnetic coupler 42. According to various aspects of the present disclosure, the first force of attraction is a magnetic force of attraction. The first force of attraction is adapted to retain the male connector 50 inserted into the female edge connector 40.

In an example embodiment of the magnetic connector system that includes the PCB 10 with a female edge connector 40 and a male connector 50, the male connector 50 may further include a third magnetic coupler 54 and the female edge connector 40 may include a fourth magnetic coupler 44. The third magnetic coupler 54 is adapted to establish a second force of attraction with the fourth magnetic coupler 44. According to various aspects of the present disclosure, the second force of attraction is a magnetic force of attraction.

As discussed above with respect to magnetic couplers 22, 24, 32 and 34, the first magnetic coupler 52, the second magnetic coupler 42, the third magnetic coupler 54 and the fourth magnetic coupler 44, as best seen in FIG. 4, may be any combination of magnets or tabs formed of a ferrous metal that establishes the first force of attraction between the first magnetic coupler 52 and the second magnetic coupler 42 and/or the second force of attraction between the third magnetic coupler 54 and the fourth magnetic coupler 44. As further discussed above, the first force of attraction and/or the second force of attraction are adapted to draw the male connector 50 into the female edge connector 40 thereby reducing the force of insertion between the PCB 10 and the male connector 50.

The second magnetic coupler 42 and the fourth magnetic coupler 44 are connected to the PCB 10 and the female edge connector 40 respectively. The second magnetic coupler 42 and/or the fourth magnetic coupler 44 may be positioned at any location along a length of the edge 18 of the PCB 10. The second magnetic coupler 42 and/or the fourth magnetic coupler 44 may be positioned inside or outside of the female edge connector 40. In an example embodiment, the second magnetic coupler 42 is positioned inside the female edge connector 40 proximate to the side 16 of the PCB 10. The fourth magnetic coupler 44 is positioned inside the female edge connector 40 proximate to the side 14 of the PCB 10.

The pins (e.g., 26, 36, 46, 56) may be formed in any manner and of any conductive material. In an example embodiment, the pins are stamped contact pins. In another example embodiment, the pins are machined pins (e.g., screw contacts). In another example embodiment, the pins may be formed of metal flowed onto the PCB 10. In an example embodiment, the tab formed of a ferrous metal that performs the function of a magnetic coupler includes a conventional weld tab.

E. Magnetically Keyed Edge Connector

As discussed above, the magnetic couplers may be used to key the edge connector on a PCB so that the edge connector will connect to another connector only in a single orientation.

Figure 5:
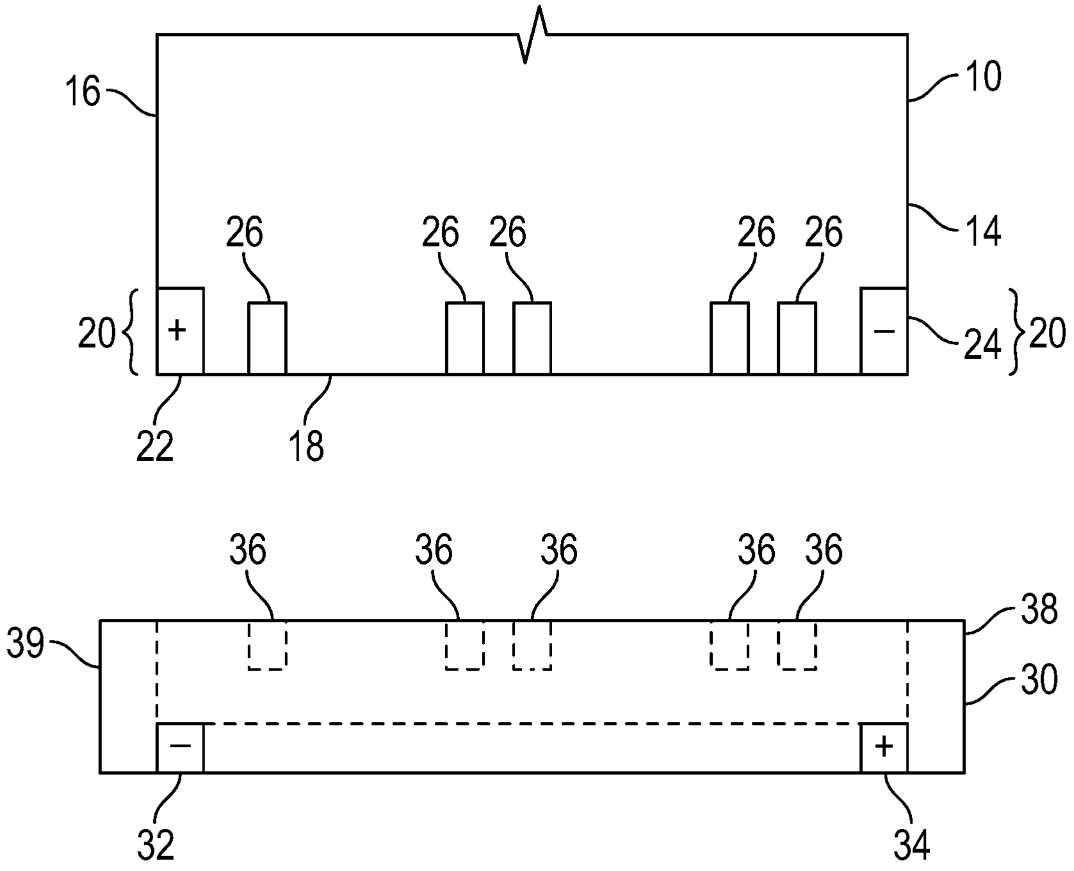
FIG. 5 is a diagram of a male edge connector that has been keyed to a female connector.

For example, as best seen in FIG. 5, the pins 26 are spaced along the edge 18 of the PCB 10 at unequal intervals. In order for the pins 26 to mate with the pins 36 of the female connector 30, the PCB 10 must be inserted into the female connector 30 so that sides 16 and 14 of the PCB 10 are positioned proximate to the sides 39 and 38 respectively of the female connector 30. If the PCB 10 were to be inserted into the female connector 30 so that side 16 of the PCB were proximate to a side 38 of the female connector 30 the pins 26 would not align with the pins 36 to provide the desired electrical connections.

In an embodiment, the magnetic couplers 22, 24, 32 and 34 are all magnets. The positive pole of the magnetic coupler 22 is positioned to be attracted to the negative pole of the magnetic coupler 32 so that the magnetic force between the magnetic coupler 22 and the magnetic coupler 32 attracts the magnetic couplers 22 and 32 toward each other. The negative pole of the magnetic coupler 24 is positioned to be attracted to the positive pole of the magnetic coupler 34, so that the magnetic force between the magnetic coupler 24 and the magnetic coupler 34 attracts the magnetic couplers 24 and 34 toward each other.

When the PCB 10 is inserted into the female connector 30, the magnetic force between the magnetic couplers 22 and 32 and the magnetic force between the magnetic couplers 24 and 34 attract the magnetic coupler 22 to the magnetic coupler 32 and the magnetic coupler 24 to the magnetic coupler 34 thereby pulling the PCB 10 into the female connector 30. Once the edge 18 of the PCB 10 is inserted into the slot of the female connector 30, the attractive magnetic force between the magnetic couplers 22 and 32 and the magnetic force between the magnetic couplers 24 and 34 retains the PCB 10 in the female connector 30.

When the PCB 10 is inserted into the female connector 30, if the orientation of the PCB 10 has been flipped so that side 16 of the PCB 10 is proximate to the side 38 of the female connector 30 and side 14 of the PCB 10 is proximate to the side 39 of the female connector 30, the magnetic force from the magnetic couplers 22 and 32 will repel each other because their poles have the same polarity. Further, magnetic force from the magnetic couplers 24 and 34 will repel each other because their poles also have the same polarity. Because the force between the magnetic couplers 22 and 32, and magnetic couplers 24 and 34 is repellent, the PCB 10 cannot be inserted into the female connector 30. Arranging the poles of the magnetic couplers (e.g., 22, 32, 24, 34) so that the forces between the magnetic couplers attract when the PCB 10 is oriented properly and repel when the PCB is not oriented properly keys the edge connector of the PCB 10 to the female connector 30 so that the PCB 10 can only be inserted into the female connector 30 at a single orientation.

F. Operation of Preferred Embodiment

In use, magnetic couplers retain an edge connector on a PCB connected to a connector and reduce the insertion force of the edge connector into the connector. For example, as the PCB 10 with male edge connector 20 is brought proximate to the female connector 30, the first force of attraction between the magnetic couplers 22 and 32 and the second force of attraction between the magnetic couplers 24 and 34 pull the male edge connector 20 into the female connector 30. The first force of attraction and the second force of attraction reduces the amount of force required to insert the male edge connector 20 into the female connector 30 thereby resulting in a low insertion force.

Inserting the male edge connector 20 into the female connector 30 brings the pins 26 of the male edge connector 20 into contact with the pins 36 of the female connector 30. Contact between the pins 26 and the pins 36 establishes electrical connections between the pins 26 and the pins 36 that are in contact with each other.

Once the male edge connector 20 has been inserted into the female connector 30, the first force of attraction between the magnetic couplers 22 and 32 and/or the second force of attraction between the magnetic couplers 24 and 34 retain the male edge connector 20 in the female connector 30 thereby maintaining the electrical connections between the pins 26 and the pins 36. The first force of attraction and/or the second force of attraction must be overcome to remove the PCB 10 from the female connector 30, so the male edge connector 20 remains in the female connector 30 during normal use.

To remove the PCB 10 from the female connector 30, a force must be applied to pull the male edge connector 20 from the female connector 30. The force that removes the male edge connector 20, and thereby the PCB 10, from the female connector 30 must overcome the first force of attraction and the second force of attraction. The force that removes the PCB 10 from the female connector must be maintained on the PCB 10 until the male edge connector 20 is far enough away from the female connector 30 so that the first force of attraction and the second force of attraction cannot pull the male edge connector 20 back into the female connector 30.

Unless otherwise defined, all technical and scientific terms used herein have the same meaning as commonly understood by one of ordinary skill in the art to which this invention belongs. Although methods and materials similar to or equivalent to those described herein can be used in the practice or testing of the various embodiments of the present disclosure, suitable methods and materials are described above. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls. The various embodiments of the present disclosure may be embodied in other specific forms without departing from the spirit or essential attributes thereof, and it is therefore desired that the various embodiments in the present disclosure be considered in all respects as illustrative and not restrictive. Any headings utilized within the description are for convenience only and have no legal or limiting effect.

What is claimed is:

1. A printed circuit board connector system, comprising:

a first printed circuit board having a male edge connector, wherein the male edge connector comprises first and second side edges of the first printed circuit board wherein each of the first and second side edges includes one or more exposed electrical contacts at which one or more traces of the first printed circuit board terminate; and a first magnetic coupler that is included on the first side edge of the first printed circuit board, wherein the first side edge, including the one or more exposed electrical contacts and the first magnetic coupler of the first printed circuit board, is adapted to be inserted into a female edge connector;

wherein the female edge connector is positioned atop a surface of a second printed circuit board, and wherein the female edge connector includes a second magnetic coupler and one or more pairs of electrical contacts that are positioned to opposing sides of a slot that receives the first and second side edges of the first printed circuit board;

whereby the one or more electrical contacts of the first and second side edges of the first printed circuit board contact the one or more pairs of electrical contacts of the female edge connector to establish one or more electrical connections, and wherein the first magnetic coupler establishes a first force of attraction with the second magnetic coupler of the female edge connector, to retain the first and second side edges of the first printed circuit board within the slot of the female edge connector.

2. The printed circuit board connector system of claim 1, wherein the first force of attraction is adapted to draw the first side edge of the first printed circuit board into the female edge connector thereby reducing a force of insertion between the first side edge of the first printed circuit board and the female edge connector.

3. The printed circuit board connector system of claim 1, wherein at least one of the first magnetic coupler and the second magnetic coupler is a magnet.

4. The printed circuit board connector system of claim 1, wherein the first magnetic coupler is a magnet and the second magnetic coupler is formed of a ferrous metal.

5. The printed circuit board connector system of claim 1, further comprising a third magnetic coupler positioned on the first side edge of the first printed circuit board wherein, the third magnetic coupler is adapted to establish a second force of attraction with a fourth magnetic coupler of the female edge connector, wherein the first force of attraction and the second force of attraction are adapted to retain the first side edge of the first printed circuit board inserted into the female edge connector.

6. The printed circuit board connector system of claim 5, wherein the first force of attraction and the second force of attraction are adapted to draw the first side edge of the first printed circuit board into the female edge connector thereby reducing a force of insertion between the first side edge of the first printed circuit board and the female edge connector.

7. The printed circuit board connector system of claim 5, wherein at least one of the first magnetic coupler and the second magnetic coupler is a magnet.

8. The printed circuit board connector system of claim 7, wherein at least one of the third magnetic coupler and the fourth magnetic coupler a magnet.

9. A magnetic connector system, comprising:

a female edge connector having one or more pairs of electrical contacts positioned at opposing sides of a slot that receives a male edge connector and a first magnetic coupler, wherein the female edge connector is positioned atop a surface of a first printed circuit board where one or more traces of the first printed circuit board terminate at the one or more pairs of electrical contacts; and a second printed circuit board having the male edge connector, wherein the male edge connector comprises first and second side edges of the second printed circuit board wherein each of the first and second side edges includes one or more exposed electrical contacts at which one or more traces of the second printed circuit board terminate and that includes a second magnetic coupler;

wherein the first and second side edges of the second printed circuit board is inserted into the female edge connector whereby the one or more electrical contacts of the first and second side edges of the second printed circuit board contact the one or more pairs of electrical contacts of the female edge connector to establish one or more electrical connections, wherein the first magnetic coupler establishes a first force of attraction with the second magnetic coupler, and wherein the first force of attraction retains the first and second side edges of the second printed circuit board within the female edge connector.

10. The magnetic connector system of claim 9, wherein the first force of attraction draws the first side edge of the second printed circuit board into the female connector thereby reducing a force of insertion between the first side edge of the second printed circuit board and the female edge connector.

11. The magnetic connector system of claim 9, wherein at least one of the first magnetic coupler and the second magnetic coupler is a magnet.

12. The magnetic connector system of claim 9, wherein the first magnetic coupler is a magnet and the second magnetic coupler is formed of a ferrous metal.

13. The magnetic connector system of claim 9, wherein the female edge connector further comprises a third magnetic coupler and wherein a fourth magnetic coupler is positioned on the first side edge of the second printed circuit board, wherein the third magnetic coupler establishes a second force of attraction with the fourth magnetic coupler, and wherein the first force of attraction and the second force of attraction retain the first side edge of the second printed circuit board within the female edge connector.

14. The magnetic connector system of claim 13, wherein the first force of attraction and the second force of attraction draw the first side edge of the second printed circuit board into the female edge connector thereby reducing a force of insertion between the first side edge of the second printed circuit board and the female edge connector.

15. The magnetic connector system of claim 13, wherein at least one of the first magnetic coupler and the second magnetic coupler is a magnet.

16. The magnetic connector system of claim 13, wherein the first magnetic coupler is a magnet and the second magnetic coupler is formed of a ferrous metal.

17. A magnetic connector system, comprising:

a male edge connector comprising first and second side edges of a first printed circuit board, each includes one or more electrical contacts at which magnetic coupler; and a second printed circuit board having a female edge connector positioned atop a surface of the second printed circuit board, wherein the female edge connector includes a slot that receives the first and second side edges of the first printed circuit board, one or more pairs of electrical contacts positioned on opposing sides of the slot, and a second magnetic coupler positioned within the female edge connector, wherein one or more traces of the second printed circuit board terminate at the one or more pairs of electrical contacts;

wherein the first and second side edges of the first printed circuit board is inserted into the female edge connector and the one or more pairs of electrical contacts of the female edge connector are electrically coupled to the one or more electrical contacts on the first and second side edges of the first printed circuit board, wherein the first magnetic coupler establishes a first force of attraction with the second magnetic coupler, and wherein the first force of attraction retains the first side edge of the first printed circuit board within the female edge connector.

18. The magnetic connector system of claim 17, wherein the first force of attraction draws the first side edge of the first printed circuit board into the female edge connector thereby reducing a force of insertion between the female edge connector and the first side edge of the first printed circuit board.

19. The magnetic connector system of claim 17, wherein at least one of the first magnetic coupler and the second magnetic coupler is a magnet.

20. The magnetic connector system of claim 17, wherein the first side edge of the first printed circuit board additionally includes a third magnetic coupler, wherein the female edge connector comprises a fourth magnetic coupler, wherein the third magnetic coupler establishes a second force of attraction with the fourth magnetic coupler, wherein the first force of attraction and the second force of attraction retain the first side edge of the first printed circuit board within the female edge connector.

* * * * *